Oct. 31, 1967                H. S. MANKEY                3,350,065
SCISSOR-TYPE LINEAR ACTUATOR WITH HIGH EXTENSION RATIO AND
SELECTABLE EXTENSION RATE AND POWER REQUIREMENT
Filed Oct. 24, 1966                               3 Sheets-Sheet 3

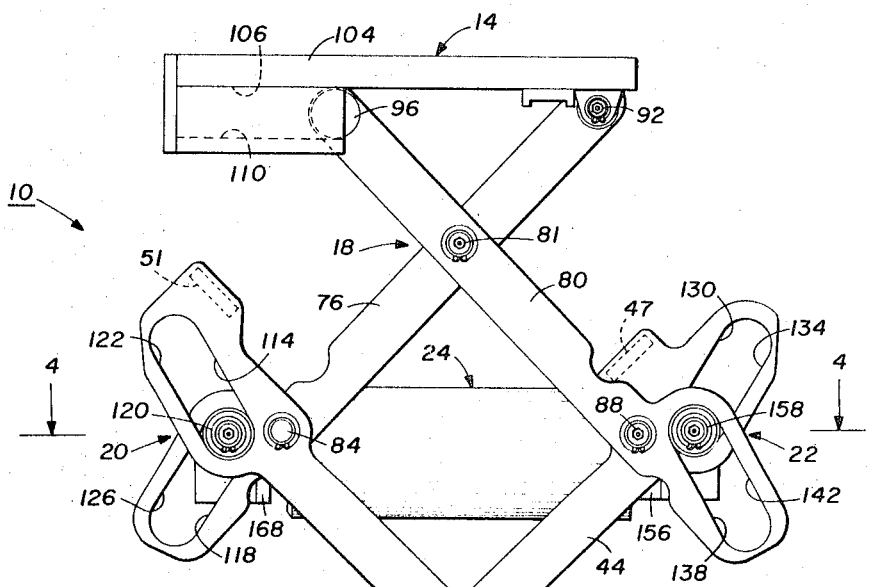
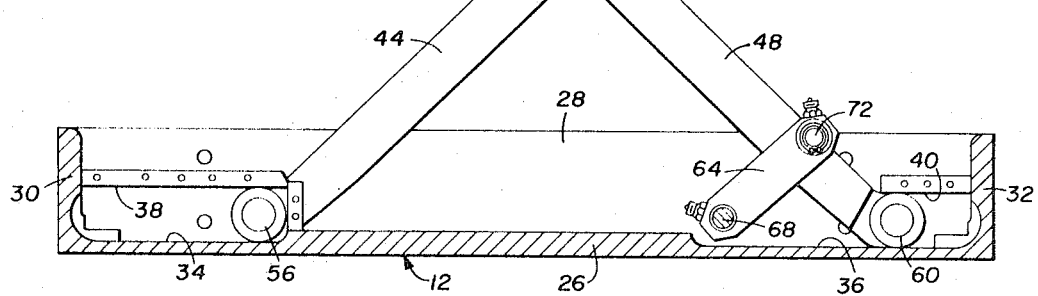
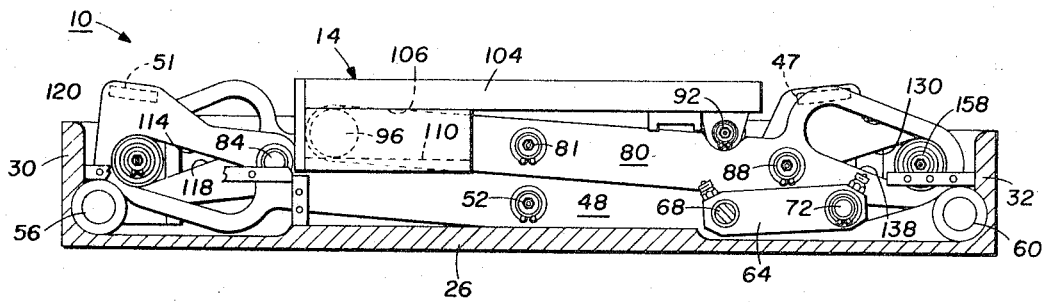

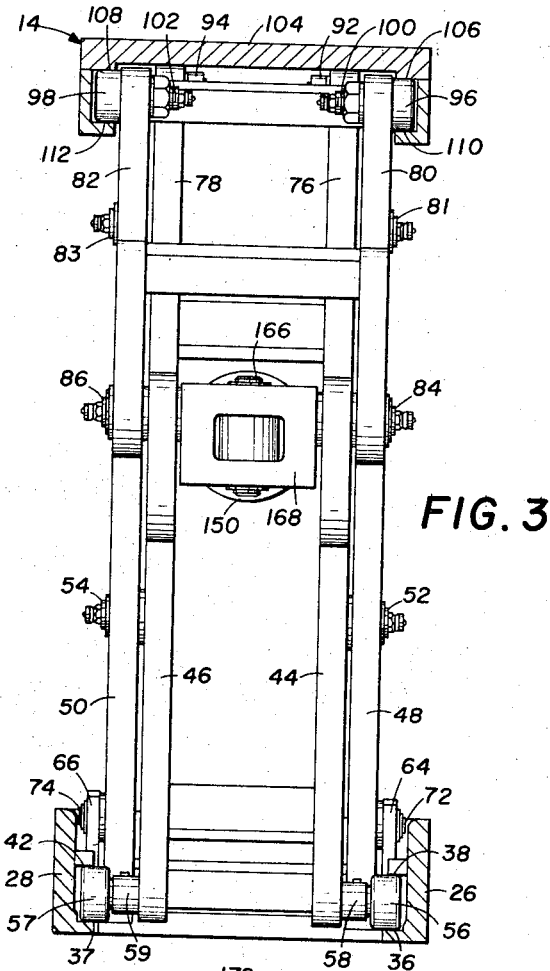
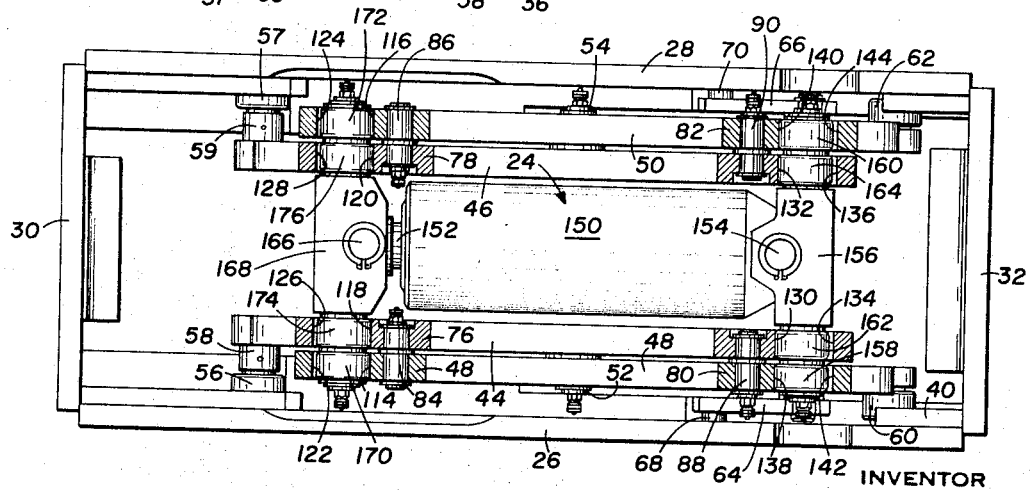
FIG. 3
FIG. 4
INVENTOR
HARRY S. MANKEY
ATTORNEY

INVENTOR
HARRY S. MANKEY

Rickards, Harris & Hubbard
ATTORNEY

United States Patent Office 3,350,065
Patented Oct. 31, 1967

3,350,065
SCISSOR-TYPE LINEAR ACTUATOR WITH HIGH EXTENSION RATIO AND SELECTABLE EXTENSION RATE AND POWER REQUIREMENT
Harry S. Mankey, Dallas, Tex., assignor to Standard Manufacturing Company Inc., Dallas, Tex., a corporation of Texas
Filed Oct. 24, 1966, Ser. No. 589,075
24 Claims. (Cl. 254—122)

This invention relates generally to linear actuators, and more particularly relates to a scissor-type linear actuator suitable for use as a vertical lift. The actuator has a high ratio of extended height to collapsed height for a given length of the scissor arms, yet has a selectable, usually uniform, rate of extension and a corresponding power requirement.

Scissor-type linear actuators, that is, actuators having one or more pairs of pivotally interconnected arms which are extended by moving the ends of the arms together, inherently have a high ratio between the extended and retracted positions. However, when the scissors are completely retracted, the force required to start extension of the scissors is very large, then decreases sinusoidally to a very low value as the scissors are extended. As a result of the large force required to "break" the scissors from the fully retracted position, the scissors are usually not fully retracted unless a special means is provided to initially "break" the scissors and start expansion. A related disadvantage of a scissor-type linear actuator is that the rate of linear extension is initially very high and then decreases as a function of the sine of the angle between the arms. Scissor-type actuators can be cascaded to multiply the total maximum expanded length. However, this tends to place high loads on the pivot pins interconnecting the successive scissor stages, particularly during the initial extension of the scissors. In some instances it is desirable to provide a multiple scissor lift in which successive scissors have different lengths in order to improve nesting of the scissors in the retracted position. However, this has the disadvantage of resulting in an arcuate movement of the lift table.

An important object of this invention is to provide a scissor-type linear actuator having a uniform, or other selected rate of expansion and retraction, and a corresponding power requirement to move the actuator between the completely retracted and completely extended positions.

Another object is to provide such a device having a higher ratio between the extended and retracted dimensions.

Another object of the invention is to provide a lift table wherein the table rises vertically.

Still another object of the invention is to provide an improved vertical lift having the foregoing advantages.

Yet another object of the invention is to provide such a device having both powered expansion and powered retraction.

A further object of the invention is to provide a multiple scissor actuator wherein the loads on the pivot pins interconnecting the arms of the successive scissors are substantially eliminated except for vertical loads.

Still another object of the invention is to provide such a device which can be powered by a hydraulic piston, screw jack or substantially any other conventional powered linear actuator means.

These and other objects are accomplished in accordance with the present invention by utilizing a single powered linear actuator to activate one or more pairs of scissors by simultaneously moving the ends of the arms either together or apart while simultaneously exerting a pivotal force on one or more of the arms by scissor camming means to extend or retract the scissors. The action of the scissor camming means initially provides substantially all the force required to break the scissors from the fully retracted position and the force progressively decreases as the scissors are extended and the power available by moving the ends of the arms together increases. As a result of the curvature of the cam, the linear extension rate of the scissors, and therefore the power required to extend the scissors, can be maintained uniformly from the fully retracted to the fully extended positions, or can be varied in substantially any manner desired.

In accordance with one more specific aspect of the invention, two pairs of scissor arms are cascaded together by pivotally interconnecting the ends of the arms of one scissor pair to the ends of the arms of the other scissor pair. A scissor cam means is formed by cam surfaces at the ends of the interconnected arms, and a cam follower provided to engage each of the scissor cam means. A linear actuator, such as a fluid cylinder and piston, pulls the two cam follower means together so that each of the cam followers engages the respective scissor cam means and exerts a pivotal force or torque on each of the arms acting about the interconnecting pins to cause the scissors to extend. At the same time, a portion of the force of the linear actuator is used to draw the interconnected ends of the arms together to cause each of the scissors to extend in the conventional manner.

The invention also contemplates scissor lift mechanisms having a single, double, triple, quadruple, or a greater number of cascaded scissor means, in which case all or any portion of the scissor arms may be individually moved from the fully retracted position by torque produced by a scissor cam means. In accordance with still another aspect of the invention, compensation means is provided to achieve a true linear movement of a lift table when nonsymmetrical scissor lifts are utilized in order to achieve a minimum contracted length.

The novel features believed characteristic of this invention are set forth in the appended claims. The invention itself, however, as well as other objects and advantages thereof, may best be understood by reference to the following detailed description of an illustrative embodiment, when read in conjunction with the accompanying drawings, wherein:

FIGURE 1 is a side elevational view, partially broken away to reveal the details of construction, of a vertical lift constructed in accordance with the present invention, the lift being illustrated in the fully extended position;

FIGURE 2 is a side elevational view showing the lift of FIGURE 1 in the fully retracted position;

FIGURE 3 is an end view, partially broken away to reveal details of construction, of the lift of FIGURE 1;

FIGURE 4 is a sectional view taken substantially on lines 4—4 of FIGURE 1;

Figures 5, 6, 7, 8:
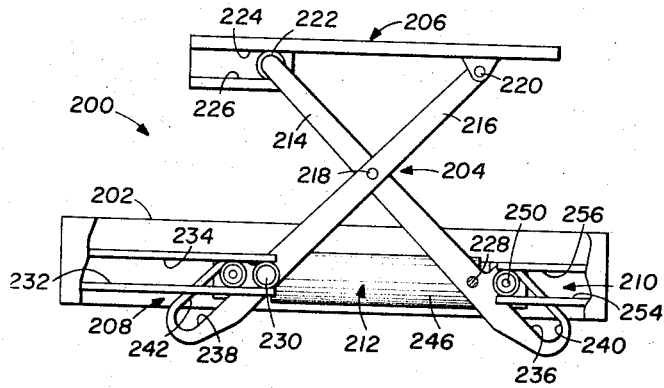
FIGURE 5 is a simplified side elevational view of a lift mechanism constructed in accordance with the present invention utilizing a single pair of scissors, and showing the scissors in the fully extended position.
FIGURE 6 is a side view similar to FIGURE 5 showing the lift of FIGURE 5 in the retracted position.
FIGURE 7 is a simplified side elevational view of another lift constructed in accordance with the present invention having four scissors and showing the lift fully extended.
FIGURE 8 is a schematic end view of the lift of FIGURE 7 showing the position of the hydraulic cylinders used to actuate the lift.

Referring now to the drawings, a device constructed in accordance with the present invention is indicated generally by the reference numeral 10 in FIGURES 1–4.

The device 10 is a dual scissor lift device having a base member indicated generally by the reference numeral 12, a lift table indicated generally by the reference numeral 14, a first scissor means indicated generally by the reference numeral 16, a second scissor means indicated generally by the reference numeral 18, double scissor cam means indicated generally by the reference numerals 20 and 22, and a linear actuator indicated generally by the reference numeral 24.

The base member 12 is essentially a rectangular frame formed by a pair of parallel, angle iron side members 26 and 28 interconnected by a pair of angle iron end members 30 and 32. Planar, upwardly facing bearing surfaces 34 and 36 are formed at opposite ends of the side member 26 and corresponding planar bearing surfaces are formed on the side member 28, although only bearing surface 37 is illustrated in FIGURE 3. It will be noted that in FIGURE 1 the flange of the side member 26 is eliminated, but not the bearing surface 36. Downwardly facing bearing surfaces 38 and 40 extend parallel to bearing surfaces 34 and 36 and are formed by bars bolted to the vertical flange of side member 26. Similar downwardly facing bearing surfaces are formed by bars bolted to the vertical flange of side member 28, although only the downwardly facing bearing surface 42 is illustrated in FIGURE 3. The center portion of the base member 12 is preferably open so as to accommodate the ends of the arms of the scissor means which will presently be described.

The first scissor means 16 is comprised of a pair of inner arms 44 and 46, which are interconnected by a crossbar 47, and a pair of outer arms 48 and 50, which are interconnected by a crossbar 51. Inner arm 44 is pivotally connected to outer arm 48 by a pivot pin 52, and inner arm 46 is similarly connected to outer arm 50 by a pivot pin 54, the axis of which is aligned with the axis of pivot pin 52. Cam follower rollers 56 and 57 are journaled on stub axles 58 and 59 which are connected to the ends of the inner arms 44 and 46. The rollers 56 and 57 ride on the upwardly facing bearing surfaces 36 and 37 and are disposed below the downwardly facing bearing surfaces 38 and 42 which retain the rollers in position against an upwardly directed force on the rollers. Similarly, cam follower rollers 60 and 62 are journaled on the ends of the outer arms 48 and 50, respectively, and ride on the upwardly facing bearing surface 36 of side member 26 and on the corresponding upwardly facing bearing surface on the side member 28 which is not illustrated, and are disposed below the downwardly facing bearing surface 40 and the downwardly facing bearing surface (not illustrated) on the flange of side member 28.

The lower scissor 16 is anchored to the base by an arc compensating linkage means comprised of a pair of lever arms 64 and 66 which are pivotally connected to the vertical flanges of side members 26 and 28 by pins 68 and 70, respectively, and are pivotally connected to the outer arms 48 and 50 by pivot pins 72 and 74, respectively.

The second scissor means 18 is also comprised of a pair of inner arms 76 and 78 (shown only in FIGURE 3), and a pair of outer arms 80 and 82 (shown only in FIGURE 3). Inner arm 76 is pivotally connected to outer arm 80 by pin 81 and inner arm 78 is pivotally connected to outer arm 82 by pin 83. The lower ends of the lower arms 76 and 78 are pivotally connected to the upper ends of the outer arms 48 and 50 of the lower scissor means 16 by pivot pins 84 and 86. Similarly, the outer arms 80 and 82 of upper scissor means 18 are connected to the inner arms 44 and 46 of the lower scissor means 16 by pivot pins 88 and 90. The upper ends of the inner arms 76 and 78 are pivotally connected to the bottom side of the lift table 14 by pins 92 and 94. Cam follower rollers 96 and 98 are journaled on the upper ends of the outer arms 80 and 82, respectively, by pins 100 and 102.

The lift table 14 has a generally planar upper surface 104 and as mentioned is pivotally connected to the upper ends of the inner arms 76 and 78. The lift table 14 also has a pair of downwardly facing bearing surfaces 106 and 108 which rest on the rollers 96 and 98, and a pair of upwardly facing bearing surfaces 110 and 112 which will engage the cam follower rollers 96 and 98 to retain the lift table 14 in position against an upwardly directed force component.

The double scissor cam means 20 is comprised of a raising scissor cam means comprised of cam surfaces 114 and 116 formed on the upper ends of the outer arms 48 and 50 of the lower scissor means 16 and a similar pair of cam surfaces 118 and 120 formed on the lower ends of the inner arms 76 and 78 of the upper scissor means 18, and a retraction scissor cam means comprised of a pair of cam surfaces 122 and 124 formed on the upper ends of the outer arms 48 and 50 of the lower scissor means 16, and cam surfaces 126 and 128 formed on the lower ends of the inner arms 76 and 78 of the upper scissor means 18. The double scissor cam means 22 is very similar to the cam means 20 and has a raising scissor cam means formed by cam surfaces 130 and 132 and formed on the upper ends of the inner arms 44 and 46 of the lower scissor means 16, and cam means 138 and 140 formed on the lower ends of outer arms 80 and 82 of the upper scissor means 18, and a retraction scissor cam means formed by cam surfaces 134 and 136 on the upper ends of inner arms 44 and 46 of the lower scissor means 16, and cam surfaces 142 and 144 formed on the lower ends of outer arms 80 and 82 of the upper scissor means 18.

The linear actuator 24 is comprised of a fluid cylinder 150 having a double acting piston (not illustrated) to which a piston rod 152 is attached. The cylinder 150 is connected by pin 154 to a first cam follower means including a cross member 156 on which are journaled outer cam followers 158 and 160 and inner cam followers 162 and 164. The outer cam follower 158 is positioned to engage either raising cam surface 138 or lowering cam surface 142 and outer cam follower 160 is positioned to engage either raising cam surface 140 or lowering cam surface 144, while the inner cam follower 162 is positioned to engage either raising cam surface 130 or lowering cam surface 134, and inner cam follower 164 is positioned to engage either raising cam surface 132 or lowering cam surface 136. The piston rod 152 is connected by a pin 166 to a second cam follower means including a cross member 168 and a pair of outer cam follower rollers 170 and 172 and a pair of inner cam follower rollers 174 and 176 which are journaled on the cross member. Outer roller 170 is positioned to engage either cam surface 114 or cam surface 122, outer roller 172 is positioned to engage either cam surface 116 or cam surface 124, inner roller 174 is positioned to engage either cam surface 118 or cam surface 126, and inner cam roller 176 is positioned to engage either cam surface 120 or cam surface 128. Fluid under pressure may be selectively introduced to either end of the cylinder 150 by suitable valving and porting means (not illustrated), and the fluid may be either a liquid or a gas. The linear actuator 24 may also be of any other suitable type, such as, for example, a conventional threaded rod having oppositely directed threads passing through suitable nuts connected to the cross members 156 and 168.

In order to understand the operation of the lift device, assume first that the device is in the retracted position as illustrated in FIGURE 2. It will be noted that the angle between the cam surface of each scissor cam means, for example surfaces 130 and 138, is very acute such that the hydraulic linear actuator 24 is fully extended and the cam follower rollers, rollers 158 and 162 for example, are at the outer ends of the respective camming surfaces.

As fluid under pressure is introduced to the rod end of the cylinder 150, the rod 152 is retracted into the cylinder and the cam follower rollers journaled on the cross member 156 are drawn toward the cam follower rollers journaled on the cross member 168. Cam follower rollers 158, 160, 162 and 164 engage and exert a force on raising cam surfaces 138, 140, 130 and 132, respectively, and rollers 170, 172, 174 and 176 engage and exert a force on raising cam surfaces 114, 116, 118 and 120, respectively. These forces are directed perpendicularly to the respective camming surfaces. Initially the major component of the force, in fact substantially the entire force, tends to spread each scissor cam means, i.e., cam surfaces 130 and 138 for example, and exert a torque on the respective arms 44 and 80 about pivot pin 88, tending to extend the scissor means. As the scissor arms extend, the angle between the cam surface of each scissor cam means increases and the cam follower rollers move closer to the pivot pins 84 and 88. This progressively decreases both the length of the effective lever arm of the forces acting on the cam surfaces and the force component and thereby decreases the torque acting on the arms about pivot pins 84 and 88. On the other hand, the horizontal vector component of the forces acting on the cam surface of the scissor cam means and thus on pins 84 and 88 initially acts through a very short effective lever arm about pivot pins 52 and 81. However, as the scissors extend, the effective lever arm of the horizontal forces acting on pins 84 and 88 about pins 52 and 81 progressively increases. As a result, the force required to move the lift table 14 from its lowermost position illustrated in FIGURE 2 to its maximum position illustrated in FIGURE 1 remains substantially constant throughout its travel. Thus, fluid introduced to the cylinder 150 at a constant pressure and a constant rate will result in a substantially constant rate of movement of the table 14.

In the embodiment of the invention heretofore described, all of the cam surfaces are straight. This results in a substantially constant rate of extension and substantially constant power requirement. A precisely uniform power requirement and uniform rate of extension can be attained by making the cam surfaces slightly arcuate, and substantially any rate profile desired can be attained by the proper curvature of the various cam surfaces.

If the table 14 is loaded, no power will, of course, be required to retract the lift. However, it should be noted that a positive retraction means is provided by the interaction of the lowering scissor cam means formed by cam surfaces 134, 136, 142, 144, 122, 124, 126 and 128. Then fluid introduced to the head end of the cylinder 150 will expand the actuator 24 and cause the lift to retract. Again the force required is substantially uniform over the full length of travel of the lift device and the rate substantially constant. It will be noted that support rollers 56, 57, 60 and 62 are retained beneath upper bearing surfaces, and the upper support rollers 96 and 98 are disposed over upwardly facing surfaces 110 and 112 so that the lift device could be used in any position, for example horizontal or inverted, if desired.

In order to achieve the minimum height illustrated in FIGURE 2, it is desirable to make the portions of the arms 44 and 48 above pivot pin 52 shorter than the portions below pivot pin 52, and to similarly make portions of the arms 76 and 80 above pivot pin 81 shorter than the portions of the arms below the pivot pin. It will be appreciated that the length of the arms 76 and 80 below pivot pin 81 must be the same as the length of the arms 44 and 48 above pivot pin 52. Such an arrangement would, however, cause the lift table 14 to move through an arcuate path, rather than a true vertical path if the lower end of one of the arms 44 or 48 were pinned to the base 12. However, the arc compensating linkages 64 and 66 together with rollers 60 and 62 insure that the lift table 14 rises vertically. It will be noted that pins 68 and 70 are located directly beneath pins 92 and 94 and that the linkage arms 64 and 66 remain substantially parallel with the inner arms 44 and 46 of the lower scissor means 16 and arms 76 and 78 of the upper scissor means 18 at all times. Thus, as the lift rises, the rollers 60 and 62 on the ends of arms 48 and 50 move inwardly so as to maintain the plate 14 moving in a vertical direction, rather than moving through an arc as would be the case if the arms 48 and 50 were pinned in the position of the rollers in FIGURE 2 as is customarily done in scissor-type lifts.

Referring now to FIGURES 5 and 6, another lift device constructed in accordance with the present invention is indicated generally by the reference numeral 200. The device 200 is comprised of a base member 202, a single scissor means indicated generally by the reference numeral 204, a lift table 206, two double scissor cam means 208 and 210, and a fluid linear actuator 212. The scissor means 204 and the lift table 206 may be substantially identical to the scissor means 18 and the lift table 14 of the lift 10 shown in FIGURE 1, the scissor means 204 being comprised of a pair of inner arms 214 which are pivotally connected to a pair of outer arms 216 by a pivot pin 218. The upper ends of the arms 216 are pivotally connected to the lift table 206 by a pivot pin 220. Rollers 222 are journaled on the upper ends of the inner arms 214 and ride between planar bearing surfaces 224 and 226. The lower end of the inner arms 214 is connected to the base frame 202 by a pivot pin 228. The lower ends of the arms 216 are pivotally and slidably connected to the base member 202 by cam follower rollers 230 which roll between upwardly and downwardly facing bearing surfaces 232 and 234, respectively. The double scissor cam means 208 is comprised of an extension scissor cam means formed by bearing surface 234 on the base member and cam surface 238 formed on the lower end of the arm 216, and retraction scissor cam means formed by bearing surfaces 232 on the base member and cam surfaces 242 on arms 216. Similarly, the double scissor cam means 210 is formed by an extension scissor cam means comprised of surfaces 232 and 256 and retraction scissor cam means formed by surfaces 240 and 254.

The linear actuator 212 may comprise a hydraulic or other fluid cylinder 246 in which is disposed a double acting piston which is connected to a rod 248. Cross members (not illustrated) similar to the cross members 156 and 168 may be connected to the cylinder 246 and the rod 248 and a pair of rollers may be journaled on each end of the cross members, as previously illustrated in FIGURE 4, the four rollers on the respective cross members being represented by the rollers 250 and 252. In the operation of the lift 200, assume that the lift is in the retracted position illustrated in FIGURE 6. In this position the linear actuator 212 is extended and the rollers 250 and 252 are at the outer extremes of the respective camming surfaces. As fluid is introduced to the rod end of the cylinder 246, rollers 250 and 252 are drawn together. As a result, cam rollers 250 engage cam surfaces 236 and 256 of the extension scissor cam means, tending to spread the scissor cams and pivot the upper end of arm 216 upwardly about pin 228. Similarly, rollers 252 engage cam surface 238 and bearing surface 234 of the other extension scissor cam means, tending to pivot arm 216 upwardly around roller 230 which rides on bearing surface 232. At the same time, a component of the force produced by the actuator 212 tends to pull the lower end of arm 216 toward pivot pin 228, thus drawing the lower ends of the scissor arms together and causing the lift table 206 to rise. Initially, the major portion of the force exerted by the linear actuator 212 goes to pivot the arms 214 and 216 about pin 228 and about roller 230 because the effective lever arm through which the forces act on the cam surfaces 236 and 238 is relatively long. However, as the lift 200 rises towards the extended position illustrated in FIGURE 5, the rollers 250 and 252 move closer to pin 228 and roller 230 so that the effective lever arm of the forces on cam surfaces 236 and 238 decreases. However, this is compensated because as pin 218 rises, the effective lever arm tending to pivot arms 214 and 216 about pin 218 increases. As a result, the force required to raise the lift table 206 is substantially constant throughout its distance of travel. Thus, if fluid is introduced to the cylinder 246 at a constant rate, the rate at which the lift table 206 rises will be substantially constant.

Referring now to FIGURES 7 and 8, another device constructed in accordance with the present invention is indicated generally by the reference numeral 300. The device 300 is comprised of a base member 302 and a lift table 304 interconnected by four cascaded scissor means 306, 307, 308 and 309. The lift is operated by two linear actuator means 310 and 312 and a pair of double scissor camming means 314 and 316 associated with actuator 310, and a pair of double scissor camming means 318 and 320 associated with actuator 312. The base 302, scissor means 306 and 307, actuator 310 and scissor camming means 314 and 316 may be substantially identical to the corresponding parts of lift 10 shown in FIGURES 1–4. Scissor means 308 and 309 together with the actuator 312 and the double scissor camming means 318 and 320 are essentially a repetition of the scissors 306 and 307 and the associated actuation means with the lower ends of the arms of scissor means 308 pivotally connected to the upper ends of the arms of scissor means 307. Also, the actuator means 312 is comprised of a pair of cylinders 322 and 324, as best seen in the schematic end view of FIGURE 8, which are each one-half the size of the single cylinder 326 of the lower hydraulic linear actuator 310. When the device 300 is collapsed, the cylinders 322 and 324 nest on opposite sides of the lower cylinder 326 to provide a minimum retracted height for the device. The rod ends of the cylinders 322, 324 and 326 are preferably connected to common fluid ports as are the head ends so that the pressures within the cylinders are equal. The total effective area of the pistons in cylinders 322 and 324 is also preferably equal to the effective area of the piston in cylinder 326 so that the force exerted by the linear actuator means 316 will be equal to that exerted by actuator means 320.

The operation of the device 300 is substantially the same as the operation of the device 10. It is very significant to note that each arm of each of the four scissors 306–309 includes a camming surface so that each of the arms is positively moved from the fully retracted position by a cam surface as heretofore described in connection with the device 10. As a result, no one pair of scissors can lock the device in the fully retracted position. Further, since each arm is acted upon directly by an actuator, the extremely high loads normally associated with breaking one pair of scissor arms from the retracted position by means of force applied to a second pair of scissor arms in the conventional manner of pulling the ends of the scissor arms together are significantly reduced.

It will be noted that linear actuators incorporating substantially any number of scissor devices can be formed by combinations of the devices illustrated. For example, the lower ends of the arms of the scissors 16 of the device 10 could be pinned to the upper ends of the arms 214 and 216 of the device 200 to provide a lift having three scissor means. Thus, devices having either odd or even numbers of scissor means may be formed wherein each scissor means is positively broken from the fully retracted position by the scissor cam means. Although fluid linear actuators, either hydraulic or gas, have been described to actuate the various lift devices, it is to be understood that any other suitable linear actuator device can be substituted to activate the lift devices. Screw-type linear actuators are particularly useful in this respect since they provide a positive locking means at any position.

It is also to be understood that the scissor-type linear actuator used in the lift tables shown can be used in any position, so as to extend upwardly, downwardly, or at any angle therebetween. Or the actuator can be constructed so as to only exert a force when expanding, or only when retracting.

As mentioned, an important aspect of the invention is that the rate at which the lift rises can be selected or programmed to change in substantially any desired manner over the travel of the lift with respect to the rate at which the linear actuator retracts by selecting the proper contour of the cam surfaces. For example, the lift may rise at a rate that is constant with respect to the rate at which the linear actuator contracts. Then if power is supplied to the linear actuator at a uniform rate, the lift table will rise at a uniform rate, or will be directly related to the rate at which power is supplied. The force required by the linear actuator is also constant if the ratio between the rate at which the table rises and the rate at which the actuator contracts is constant. Or the cam may be contoured such that the lift rises at an irregular rate with respect to the rate at which the linear actuator contracts. However, the power requirement will then vary in approximately the same manner over the travel of the lift.

Although preferred embodiments of the invention have been described in detail, it is to be understood that various changes, substitutions and alterations can be made therein without departing from the spirit and scope of the invention as defined by the appended claims.

What is claimed is:
1. In a scissor-type linear actuator, the combination of:
a pair of pivotally interconnected arms which are extensible by moving the ends of the arms together and retractable by moving the ends of the arms apart,
support means for the ends of the arms permitting movement of the ends of the arms together and apart,
pivot means connecting the end of one of the arms to the support means such that a torque can be exerted on said one arm to cause extension or retraction of the arm,
scissor cam surface means formed on the end of said one arm and said support means,
cam follower means for cooperatively engaging the scissor cam surface means and exerting a torque between said one arm and the support means acting about said pivot means, said torque tending to extend or retract the arms, and
linear actuator means for moving the cam follower means and the end of the other arm either together or apart to either extend or retract the arms as a result of the combined effect of the torque exerted on the arm by the scissor cam surface means and the movement of the ends of the arms one relative to the other.
2. The combination defined in claim 1 wherein said one arm is pivotally connected to the support means by a fixed pivot pin.
3. The combination defined in claim 1 wherein said one arm is pivotally connected to the support means by a pivot pin slidably connected to the support means to permit movement of the end of said arm toward the end of the other arm.
4. The combination defined in claim 1 wherein the end of at least one of the arms is pivotally and slidably connected to the support means, scissor cam surface means are formed on the end of each arm and the support means, a cam follower means is provided for each of the two scissor cam surface means, and the two cam follower means are interconnected by a linear actuator for moving the cam follower means either together or apart to thereby either extend or retract the arms.
5. The combination defined in claim 1 wherein the support means comprises a second pair of scissor arms pivotally interconnected at midpoints thereof, one end of each of the second pair of scissor arms being pivotally connected to one end of said pair of pivotally interconnected arms, said scissor cam surface means being formed on said one arm and the arm of said second pair of scissor means to which said one arm is pivotally connected.

6. The combination defined in claim 5 further characterized by second scissor cam surface means formed on the end of the other arm and the end of the arm of the second scissor means to which said other arm is pivotally connected, and second cam follower means for engaging the second scissor cam surface means, said linear actuator means interconnecting the two cam follower means.

7. The combination defined in claim 1 wherein the scissor cam surface means is positioned such that the cam follower means exerts a torque tending to extend the arms.

8. The combination defined in claim 1 wherein the scissor cam surface means is positioned such that the cam follower means exerts a torque tending to retract the arms.

9. The combination defined in claim 1 wherein there are two scissor cam surface means formed between said one arm and said support means, and said cam follower means is adapted to engage both scissor cam surface means, one of said scissor cam means being positioned to exert a torque on said arm tending to extend the arms and the other being positioned to exert a torque on said arm tending to retract the arms.

10. In a scissor-type linear actuator, the combination of:
a base member,
first and second scissor arms pivotally interconnected at midpoints thereof by first pivot means,
second and third pivot means connecting the ends of the first and second scissor arms, respectively, to the base member, at least one of the second and third pivot means permitting movement of the end of the arm longitudinally of the base member such that the scissor arms may be extended by movement of the ends of the arms together and retracted by movement of the ends of the arms apart,
scissor cam means comprised of a first cam surface means formed on the first scissor arm at a point beyond the second pivot means and a second cam surface means formed on the base member and disposed at an acute angle to the first cam surface means such that the angle increases as the scissor arms are extended,
cam follower means for engaging the first and second cam surface means, and
linear actuator means interconnecting the cam follower means and the end of the second scissor arm for moving the ends of the arms either together or apart to extend or retract the scissor arms and simultaneously exert a force on the cam surface tending to pivot the first scissor arm about the second pivot means in a direction to complement the extension or retraction of the scissor arms.

11. In a scissor-type linear actuator, the combination of:
first and second scissor arms pivotally interconnected by a first pivot means to form a first scissor means,
third and fourth scissor arms pivotally interconnected by a second pivot means to form a second scissor means,
third pivot means pivotally connecting the end of the first scissor arm to the end of the third scissor arm,
fourth pivot means pivotally connecting the end of the second scissor arm to the end of the fourth scissor arm,
first scissor cam means comprising a first cam surface formed on the end of the first scissor arm beyond the third pivot means and a second cam surface formed on the end of the third scissor arm beyond the third pivot means,
first cam follower means for engaging the first and second cam surfaces and exerting a force on the cam surfaces tending to pivot the first scissor arm relative to the third scissor arm about the third pivot means, and
actuator means interconnecting the first cam follower means and the fourth pivot means for moving the first cam follower means toward and away from the fourth pivot means whereby the first and second scissor means will be extended or retracted as a result of movement of the third and fourth pivot means together and apart and as a result of the operation of the first cam follower means acting on the first scissor cam means to pivot the first scissor arm relative to the third scissor arm about the third pivot means.

12. The combination defined in claim 11 further characterized by:
second scissor cam means comprising a third cam surface formed on the end of the second scissor arm beyond the fourth pivot means and a fourth cam surface formed on the end of the fourth scissor arm beyond the fourth pivot means,
second cam follower means for engaging the third and fourth cam surfaces and exerting a force on the surfaces tending to pivot the second scissor arm relative to the fourth scissor arm about the fourth pivot means, and wherein
the actuator means interconnects the first and second cam follower means.

13. The combination defined in claim 12 wherein the first and second scissor cam means are position such that the force exerted by the first and second cam follower means produces a torque tending to extend the first and second scissor means.

14. The combination defined in claim 12 wherein the first and second scissor cam means are positioned such that the force exerted by the first and second cam follower means produces a torque tending to retract the first and second scissor means.

15. The combination defined in claim 12 further chracterized by:
third scissor cam means comprising a fifth cam surface formed on the end of the first arm beyond the third pivot means and a sixth cam surface formed on the end of the third scissor arm beyond the third pivot means,
fourth scissor cam means comprising a seventh cam surface formed on the end of the second arm beyond the fourth pivot means and an eighth cam surface formed on the end of the fourth scissor arm beyond the fourth pivot means, and wherein
the first cam follower means is also adapted to engage the fifth and sixth cam surfaces and the second cam follower means is also adapted to engage the seventh and eighth cam surfaces, the first and second cam surfaces being positioned such that when the first and second cam follower means are moved together the first and second scissor means will be extended and the third and fourth scissor cam means being positioned such that when the first and second cam follower means are moved apart the first and second scissor means will be retracted.

16. The combination defined in claim 11 further chracterized by a base member for supporting the ends of the first and second scissor arms opposite from the third and fourth pivot means such that the ends of the arms may move together and apart and lift table means supported by the ends of the third and fourth scissor arms remote from the third and fourth pivot means, said lift table being pivotally connected to the end of one of the arms and slidably resting on the end of the other.

17. The combination defined in claim 16 wherein the portions of the third and fourth scissor arms between the fourth pivot means and the lift table are shorter than the portions of the first and second arms between the third pivot means and the base member, the ends of both the first and second scissor arms are slidably disposed on the base member, and one of the arms is connected to the base member by arc compensation means pivotally connected to the base member and to the arm such that the lift table will move linearly with respect to the base member as the first and second scissor means are extended and retracted.

18. The combination defined in claim 1 wherein the scissor cam surface means are contoured such that the rate at which the scissor-type linear actuator extends or retracts is substantially constant with respect to the rate at which the linear actuator means retracts or extends, respectively, over the travel of the scissor-type linear actuator.

19. The combination defined in claim 1 wherein the scissor cam surface means are contoured such that the rate at which the scissor-type linear actuator extends or retracts changes in a predetermined manner with respect to the rate at which the linear actuator means retracts or extends, respectively, over the travel of the scissor-type linear actuator.

20. The combination defined in claim 1 wherein each cam surface of the scissor cam surface means is straight.

21. The combination defined in claim 11 wherein the scissor cam surface means are contoured such that the rate at which the scissor-type linear actuator extends or retracts is substantially constant with respect to the rate at which the linear actuator means retracts or extends, respecively, over the travel of the scissor-type linear actuator.

22. The combination defined in claim 11 wherein the scissor cam surface means are contoured such that the rate at which the scissor-type linear actuator extends or retracts changes in a predetermined manner with respect to the rate at which the linear actuator means retracts or extends, respectively, over the travel of the scissor-type linear actuator.

23. The combination defined in claim 11 wherein each cam surface of the scissor cam surface means is straight.

24. A multiple scissor lift comprising a plurality of pairs of pivotally interconnected scissor arms cascaded together by pivotal interconnections between the corresponding ends of the scissor arms of adjacent pairs, a scissor cam surface means formed at the interconnected ends of the scissor arms such that each scissor arm has a scissor cam surface means formed at at least one end thereof, cam follower means cooperatively engaging each scissor cam surface means and exerting to torque between the ends of the two arms acting about the pivotal interconnection between the two arms tending to extend or retract the arms, and a linear actuator for moving each cam follower means and the interconnected ends of the other arms of the two pairs of arms forming the scissor cam surface means either together or apart to either extend or retract the scissor lift as a result of the combined effect of torque exerted on the arms by the scissor cam means and cam follower means and the movement of the ends of the arms one relative to the other.

References Cited
UNITED STATES PATENTS

| | | | |
|---|---|---|---|
| 182,070 | 9/1876 | Hennert | 254—122 |
| 298,568 | 5/1884 | Fisher | 254—126 |
| 1,365,252 | 1/1921 | Langill | 187—18 |
| 1,675,494 | 7/1928 | Jennings | 74—520 |
| 2,121,861 | 6/1938 | Dickerson | 254—126 |
| 2,862,689 | 12/1958 | Dalrymple et al. | 254—8 |

OTHELL M. SIMPSON, *Primary Examiner.*